United States Patent
Boerner et al.

(10) Patent No.: US 9,354,626 B2
(45) Date of Patent: May 31, 2016

(54) METHOD FOR RESTARTING A ROBOT

(75) Inventors: Gunter Boerner, Sinsheim/Eschelbach (DE); Dietmar Eickmeyer, Heddesheim (DE)

(73) Assignee: ABB AG, Mannheim (DE)

( * ) Notice: Subject to any disclaimer, the term of this patent is extended or adjusted under 35 U.S.C. 154(b) by 2130 days.

(21) Appl. No.: 12/361,555

(22) Filed: Jan. 29, 2009

(65) Prior Publication Data

US 2009/0198378 A1      Aug. 6, 2009

(30) Foreign Application Priority Data

Feb. 1, 2008   (DE) .......................... 10 2008 007 438

(51) Int. Cl.
| | | |
|---|---|---|
| G05B 19/18 | (2006.01) | |
| G05B 19/4067 | (2006.01) | |
| B25J 9/16 | (2006.01) | |

(52) U.S. Cl.
CPC ........... *G05B 19/4067* (2013.01); *B25J 9/1679* (2013.01); *G05B 2219/50103* (2013.01)

(58) Field of Classification Search
USPC .......... 700/250; 118/323, 668, 707, 315, 313, 118/305, 314, 300; 427/424; 318/568, 140, 318/568.1, 567
See application file for complete search history.

(56) References Cited

U.S. PATENT DOCUMENTS

| 4,170,751 | A | | 10/1979 | Stricker | |
|---|---|---|---|---|---|
| 4,484,120 | A | * | 11/1984 | Olex et al. ................ | 318/568.14 |
| 4,810,538 | A | * | 3/1989 | Handke et al. ................ | 427/424 |
| 7,762,207 | B2 | * | 7/2010 | Endregaard et al. .......... | 118/313 |
| 2007/0289358 | A1 | | 12/2007 | Eickmeyer et al. | |
| 2008/0125909 | A1 | | 5/2008 | Eickmeyer et al. | |

FOREIGN PATENT DOCUMENTS

| DE | 2903318 | | 8/1979 |
|---|---|---|---|
| DE | 3012088 | A1 | 10/1980 |
| DE | 19507759 | A1 | 9/1995 |

(Continued)

*Primary Examiner* — Ronnie Mancho
(74) *Attorney, Agent, or Firm* — Leydig, Voit & Mayer, Ltd.

(57) ABSTRACT

A method for restarting a robot after a premature interruption of a processing program, which controls it, at an interruption point. The robot has an atomizer apparatus for automatic coating of workpieces, and the processing program is used to preset a nominal movement of the atomizer apparatus with respect to a workpiece, which is to be coated and can be moved by means of a feed device, and to preset the associated nominal atomizer parameters. After the interruption of the processing program, the atomizer apparatus is first of all moved to a restarting point, which is located on the nominal movement path and is located ahead of the interruption point. After this, the atomizer apparatus is then moved on the nominal movement path, corresponding to a predeterminable velocity function, to a transfer point which is located on the nominal movement path and is located behind the interruption point. The atomizer apparatus is switched on again between the restarting point and the transfer point. The nominal atomizer parameters which are provided by the processing program are matched and are applied at least once, between the restarting point and the transfer point, to the respective current velocity of the atomizer apparatus, in relation to the nominal velocity preset, and all of the nominal movement parameters and nominal atomizer parameters in the processing program are used when the transfer point is reached.

9 Claims, 3 Drawing Sheets

(56) References Cited

FOREIGN PATENT DOCUMENTS

| DE | 19857436 | A1 | 6/2000 |
| DE | 10342471 | A1 | 4/2005 |
| DE | 102007026041 | | 6/2008 |
| EP | 0285075 | | 10/1988 |
| EP | 1393816 | | 3/2004 |
| EP | 0084523 | | 8/2009 |

* cited by examiner ously has a disadvantageous influence on the coating quality achieved at the interruption point.

SUMMARY OF THE INVENTION

METHOD FOR RESTARTING A ROBOT

Priority is claimed to German Patent Application No. DE 10 2008 007 438.1, filed on Feb. 1, 2008, the entire disclosure of which is incorporated by reference herein.

The present invention relates to a method for restarting a robot after a premature interruption in a processing program, which controls it, at an interruption point, with the robot having an atomiser apparatus for automatic coating of workpieces, and with the processing program being used to preset a nominal movement of the atomiser apparatus on a nominal movement path with respect to a workpiece which is to be coated and can be moved by means of a feed device, and to preset the associated nominal atomiser parameters, with the current status of the processing program at the time of the interruption being stored.

BACKGROUND

Referring to FIG. 3, it is generally known that robots 40 are used for industrial painting purposes, for example for painting motor-vehicle bodies. Robots 40 such as these have an atomiser apparatus 42, for example a high-speed rotating atomiser or an air atomiser. The workpieces 50 to be painted are normally located on a goods mount, which can be moved with the aid of a feed device 52, for example a floor conveyor or a hanging conveyor. This allows the workpieces 50 to be fed into and out of a painting cabin.

Depending on the given constraints, it is both planned practice for the workpieces 50 to be moved continuously by the feed device 52 during the painting process and for them not to be moved during the painting process.

A processing program 44 presets both the nominal movement of the atomiser device around the workpiece 50 to be painted, with this nominal movement being carried out by the robot 40, and the nominal atomiser parameters, by means of which the atomiser device 42 is operated. In this case, the atomiser device 42 is moved relative to the workpiece 50.

In an exceptional situation, for example in the event of an emergency stop, the processing program is interrupted immediately, that is to say the movement of the atomiser device is stopped and the atomiser apparatus is switched off, as a result of which the painting process is interrupted. Furthermore, the feed device is also stopped. After the interruption, the robot and the atomiser apparatus as well as the workpiece to be coated are in an undefined position with respect to one another, as a result of the mass inertia, because of the different and/or undefined braking response.

There are various procedures for restarting the coating process at or in the vicinity of the interruption point, in such a way that, as far as possible, the interruption does not result in any deterioration to the coating result on the workpiece to be coated.

One possible procedure is known from European Patent EP 0 285 075, in which the resumption of the movement of the atomiser apparatus takes place according to the prior art described therein, with the nominal velocity being suddenly preset. Because of the mass inertia of the coating apparatus, the actual velocity of the atomiser apparatus during the acceleration process is generally less than the nominal preset velocity. The resumption of the coating process, started at the same time, by use of the nominal atomiser parameters leads to the workpiece to be coated being overcoated during the acceleration process.

Furthermore, the resumption of the use of the nominal atomiser parameters in an initial phase is also accompanied by an unstable spraying process, which likewise has a disadvantageous influence on the coating quality achieved at the interruption point.

SUMMARY OF THE INVENTION

An aspect of the present invention is to provide a method for restarting a robot after a premature interruption in a processing program, wherein the quality of the coating result on restarting can be improved.

The present invention provides a method for restarting a robot wherein, after the interruption in the processing program, the atomiser apparatus is moved, taking account of the position of the workpiece, first of all in the direction of a starting point to a restarting point which is located on the nominal movement path and is located ahead of the interruption point. The atomiser apparatus is then moved on the nominal movement path corresponding to a predeterminable velocity function to a transfer point which is located on the nominal movement path, but behind the interruption point, and from which the defined nominal processing parameters are used. The atomiser apparatus is switched on again between the restarting point and the transfer point, the nominal atomiser parameters which are provided by the processing program are matched and are applied one or more times as necessary, between the restarting point and the transfer point, to the respective current velocity of the atomiser apparatus, in relation to the nominal velocity preset. All of the nominal movement parameters and nominal atomiser parameters in the processing program are used when the transfer point is reached.

A procedure such as this for restarting the robot, that is to say focusing on the restarting area between the restarting point and the transfer point, considerably reduces the influence of transient processes on the coating process, and thus improves the coating result.

Any discrepancies between the actual movement velocity and the preset movement velocity are reduced considerably by an increase, which can be predetermined by means of the velocity function, in the velocity of the atomiser movement in the restarting range. This is due in particular to the reduced requirements associated therewith for the acceleration capability of the relevant robot.

Velocity discrepancies are the governing factor for deterioration of the coating result, that is to say an atomiser which is moved too slowly in comparison to the nominal velocity necessarily applies an excessive layer thickness in the relevant area when nominal application parameters are used.

The process of switching on the atomiser, which also involves the transient process of the spraying process, is also a further significant factor for the quality of the coating result in the restarting area. Adaptation of the atomiser parameters to a reduced velocity also in consequence reduces the outlet flow rate required in the areas with a reduced velocity. A reduced outlet flow rate in turn results in a reduced transient response of the spraying process, which likewise has an advantageous effect on the coating result.

According to one further refinement of the method according to the invention, the atomiser apparatus is switched on in a range for switching on again which covers the interruption point and a switching-off point at which the coating process was ended after the unplanned, fault-induced interruption of the processing program.

The coating process accordingly restarts at a point in the processing program at which it was previously interrupted. The coating result can thus be improved further in an advantageous manner, despite the disturbance.

In one particularly preferred variant of the method according to the invention, a velocity-independent layer thickness distribution of the applied coating material is achieved with the adaptation of the atomiser parameters, which layer thickness distribution corresponds approximately to that for nominal atomiser parameters.

Such adaptation means that the geometric shape of an atomiser spray pattern with a reduced movement velocity is equivalent to the geometric shape of the atomiser spray pattern at the nominal movement velocity. In this case, this results only in a proportional difference with regard to the applied layer thickness which is produced by means of the respective spray patterns when using the same coating material and the same movement parameters in each case on an identical workpiece.

The movement velocity of the atomiser can thus advantageously be varied without this leading to a change in the coating result in comparison to the coating result at the nominal velocity.

According to one particularly advantageous refinement of the method according to the invention, at least the parameters comprising the paint outlet flow rate as well as the guidance air and/or horn air are adapted.

The respective adaptation of the outlet flow rate to the application material or paint is carried out in particular corresponding to the ratio of the nominal movement velocity to the respective movement velocity in the restarting area, in order in this way to match the applied amount of paint per movement distance in both cases. Discrepancies from this ratio lead to a different efficiency of the coating process.

The guidance air is a parameter for a rotating atomiser, by means of which the shape of a spray pattern can be varied. A corresponding parameter for an air atomiser is the horn air. The spray pattern can be matched in a suitable manner to a changed movement velocity by adaptation of these parameters.

According to one particularly preferred variant of the method, the atomiser parameter rotation speed or atomiser air is also adapted.

In the case of a rotating atomiser, the rotation speed is a measure of the atomizing of the application material or paint. In the case of an air atomiser, this is the atomiser air. If the parameter which governs the atomizing process, that is to say the rotation speed or the atomiser air, is kept constant when the paint outlet flow rate from an atomiser is varied, then the droplet size of the paint particles in the atomizing process accordingly changes.

An increased paint flow rate requires an increased amount of atomizing energy, however, that is to say an increased rotation speed or an increased amount of atomiser air, in order to keep the droplet size of the paint particles approximately constant.

However, a constant droplet size distribution once again advantageously further matches the coating result in the restarting area to the coating result in the nominal state, that is to say to the coating result without any interruption in the processing program using nominal parameters.

According to a further embodiment, the predeterminable velocity function at the transfer point corresponds to the nominal velocity preset by the processing program. The continuity of the parameters in the transfer area avoids transient processes in the atomiser movement, further improving the coating result.

According to a further variant of the method according to the invention, the adapted atomiser parameters at the transfer point correspond to the atomiser parameter preset by the processing program. In this case as well, the continuity of the painting parameters in the transfer area avoids transient processes, further improving the coating result.

According to one preferred embodiment variant, the velocity preset by the velocity function corresponds to a position-dependent or time-dependent ramp, which advantageously avoids discontinuities in the movement, leading to a further improved coating result.

According to one advantageous variant of the method according to the invention, the atomiser parameters are adapted before they are used for restarting. In this case, the atomiser parameters are determined and stored taking account of the velocity preset in the restarting area, in predeterminable time or distance sections for the respective section. By way of example, the respective atomiser parameters can be stored by providing an external data processing system, which is linked to the robot, or else a data processing system which is used as a control unit for the robot.

Computation times which are required to determine the adapted atomiser parameters and disadvantageously reduce the number of possible adaptation steps can thus advantageously be displaced to a time period, in which the time is not critical, before restarting.

The number of the sections in which adaptation of the atomiser parameters is carried out can in this way be increased.

According to one particularly preferred embodiment of the method according to the invention, switching delay times of the atomiser apparatus are compensated for, thus improving the accuracy of compliance with switching points, and once again improving the quality of the coating result.

These and further advantageous refinements and improvements of the invention are the subject matter of the claims.

BRIEF DESCRIPTION OF THE DRAWINGS

The invention, advantageous refinements and improvements of the invention as well as particular advantages of the invention will be explained and described in more detail with reference to one exemplary embodiment of the invention, which is illustrated in the attached drawing, in which.

DETAILED DESCRIPTION OF A PREFERRED EMBODIMENT

Figure 1:
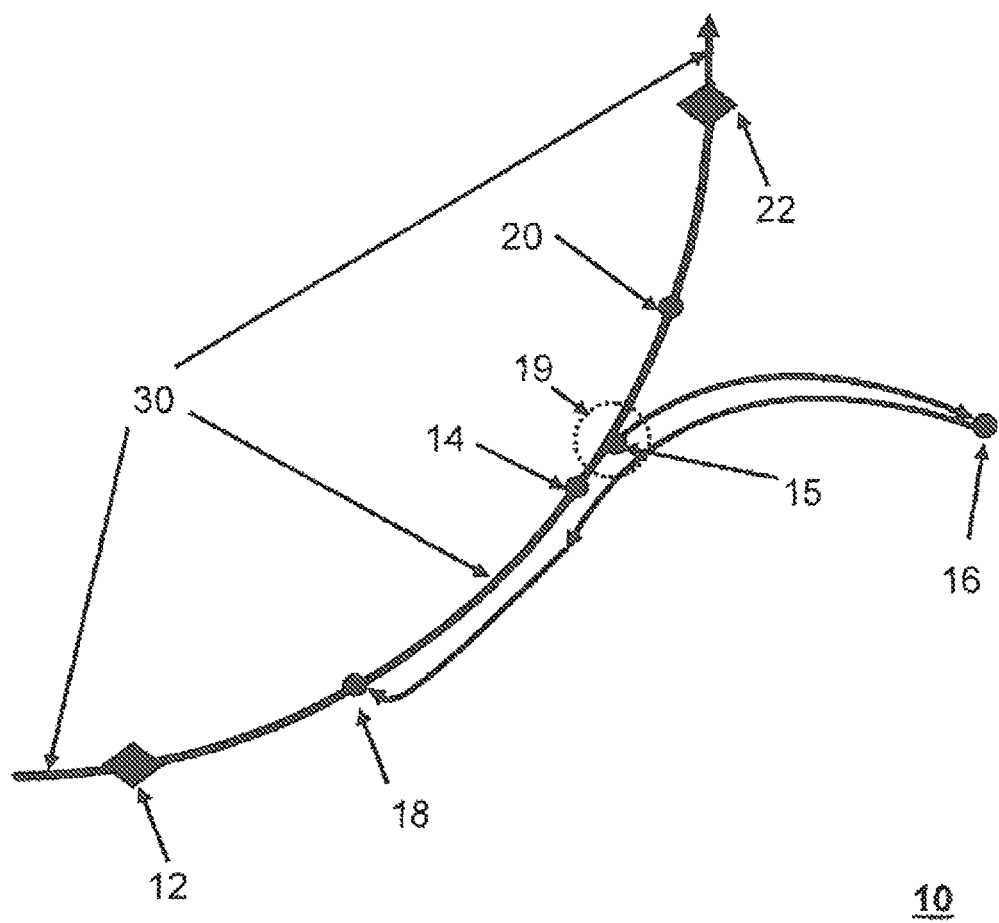
FIG. 1 shows an outline sketch of the procedure for restarting.
Figure 3:
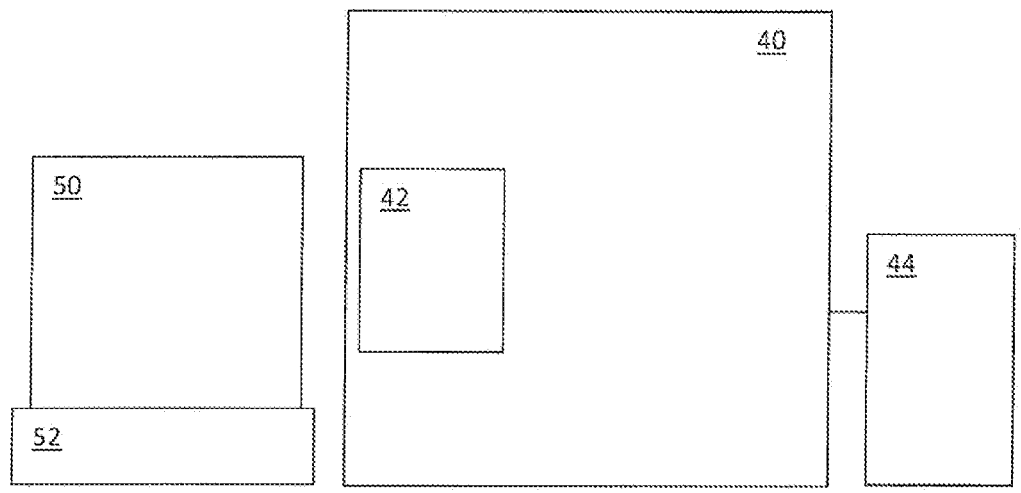
FIG. 3 schematically shows a conventional robot used for industrial painting purposes.

FIG. 1 shows a schematic illustration of one example of a procedure plan 10 for the procedure according to the invention for restarting a robot 40 with an atomiser apparatus 42 (see FIG. 3). Before the occurrence of an interruption in the processing program 44, the atomiser apparatus 42 is moved with a robot 40 according to the program along the nominal movement path 30 at a nominal velocity. The atomiser is active and carries out the application process using the application parameters provided for the respective path section. In the case of a rotating atomiser, these may in particular be the paint outlet flow rate, the rotation speed, first guidance air, second guidance air or else a high voltage. The planned parameters for an air atomiser are the paint outlet flow rate, the horn air and the atomiser air.

The atomiser is now moved over the first path point 12. A nominal movement path is achieved for the atomiser movement by sequentially moving to path points which normally include the coordinates of a point and its orientation in space.

It is normal practice for points such as these not always to be moved to directly if they do not lie on one straight line, but to be obliterated automatically by control of the robot in a predeterminable radius around the point, for example 100 mm.

The atomiser now reaches the termination point 14. An interruption signal is produced precisely at this point, for example caused by operation of an emergency-stop switch, which results in an interruption of the processing program. The brakes of all the shafts of the robot which moves the atomiser for example at a velocity of 1200 mm/s, are operated and the robot movement ends after a braking process at an undefined end point 16 which, for example, is located at a distance of 20 cm to 40 cm from the interruption point, and not on the nominal movement path. Furthermore, a feed device which may possibly be provided and on which the workpiece to be painted is located is stopped as well, as a result of which the final position of the atomiser apparatus with respect to the workpiece to be painted is undefined to an even greater extent at the final position 16.

In addition to interrupting the robot movement, the interruption signal also interrupts the painting process. In particular, the supply of paint to the atomiser apparatus is interrupted. As a result of the time delay in switching an appropriate valve, the atomizing process is effectively interrupted only on crossing over the interruption point 15. With an assumed reaction time of the interruption in the paint supply of 50 ms and an assumed movement velocity, which is constant as before, of 1000 mm/s, this would result, by way of example, in a distance of 50 mm between the termination point 14 and the interruption point 15.

The entire painting process is now interrupted, and a possible cause of the interruption can be rectified. After rectification, the painting process must be resumed in a manner such that there is as little adverse effect as possible in the painting result around the termination point 14 and around the paint switch-off point 15.

To this end, the atomiser is first of all moved to the relative position with respect to the workpiece to be coated corresponding to the restarting point 18. This is located on the movement path according to the program, to be precise at a point before the termination point 14. This movement can be carried out manually, or else automatically on a movement path which is determined specifically by a control device, in which case, in particular, it is necessary to avoid collisions between the workpiece to be painted and the robot and/or the atomiser apparatus.

The robot movement is now started along the movement path according to the program, in which case the atomiser apparatus initially is not yet switched on, and in which case the preset for the robot movement velocity is matched to the nominal velocity in a similar manner to a ramp, starting for example at 0 mm/s. The atomiser now passes the termination point 14 at a velocity of, for example, ⅓ of the nominal velocity. The interruption point 15 is likewise passed, in which case, in some circumstances, there is a slight discrepancy between this point and the nominal movement path. FIG. 1 shows a range 19 for switching on again, which is formed from a circle around the interruption point 15 and has an intersection area with the robot movement path 30 according to the program.

When the atomiser enters this intersection area, the application of the atomiser is restarted. Care must be taken to ensure that any switching delay times in switching on the atomiser can expediently be compensated for, such that the actual painting process actually starts in the intersection area.

In this restarting phase, the atomiser parameters are matched to the movement velocity of the atomiser, which is moved along its nominal movement path at a velocity which is less than the nominal velocity according to the program. To a first approximation, the matching of the atomiser parameters to the reduced velocity results in the spraying result which is achieved in the restarting phase on the coated workpiece being similar to the spraying result which would have been achieved with the nominal parameters of the processing program, that is to say using nominal movement data and nominal atomiser data.

In principle, with a velocity of, for example, ⅓ of the nominal velocity, the paint outlet flow rate should initially also be reduced to ⅓ of the nominal outlet flow rate. Since, however, the change in the outlet flow rate also changes the shape of the spray pattern—as a consequence of this, for example, this spray pattern can have a different width—further application parameters must be adapted such that the shape of the spray pattern is maintained with the reduced outlet flow rate. Further iteration steps are feasible in which, for example, the accuracy of the adaptation is improved, for example also with respect to the change in the application efficiency with different atomiser parameters. One suitable method for adaptation of the application parameters is described, for example, in DE 102007026041.7.

In this case, the section length of the movement path in which transient processes on switching on the atomiser have a negative influence on the painting result is particularly advantageously limited to ⅓ of the section length at the nominal velocity. Furthermore, transient processes such as these with reduced paint outlet flow rates are likewise reduced, thus further improving the painting quality that is achieved.

A further quality improvement of the painting result is achieved by accelerating the atomiser over a longer section, specifically between the restarting point 18 and the transfer point 20, as a result of which the actual movement velocity corresponds to a major extent to the respective preset of the nominal velocity. This avoids overcoating as a result of the actual robot movement being too slow in comparison to the velocity preset.

The switched-on atomiser is now accelerated further by means of the robot and reaches the transfer point 20. The atomiser parameters are preferably adapted continuously. However, this is generally not feasible, for technical reasons. For this reason, it has been found to be expedient to carry out the adaptation of the atomiser parameters in steps.

At the transfer point 20, the atomiser has expediently already been accelerated to the nominal movement velocity. The atomiser parameters used have accordingly already been adapted at this point such that they correspond to the nominal atomiser parameters. Beyond the transfer point, a continuous transition is now made to the parameters in the processing program.

Figure 2:
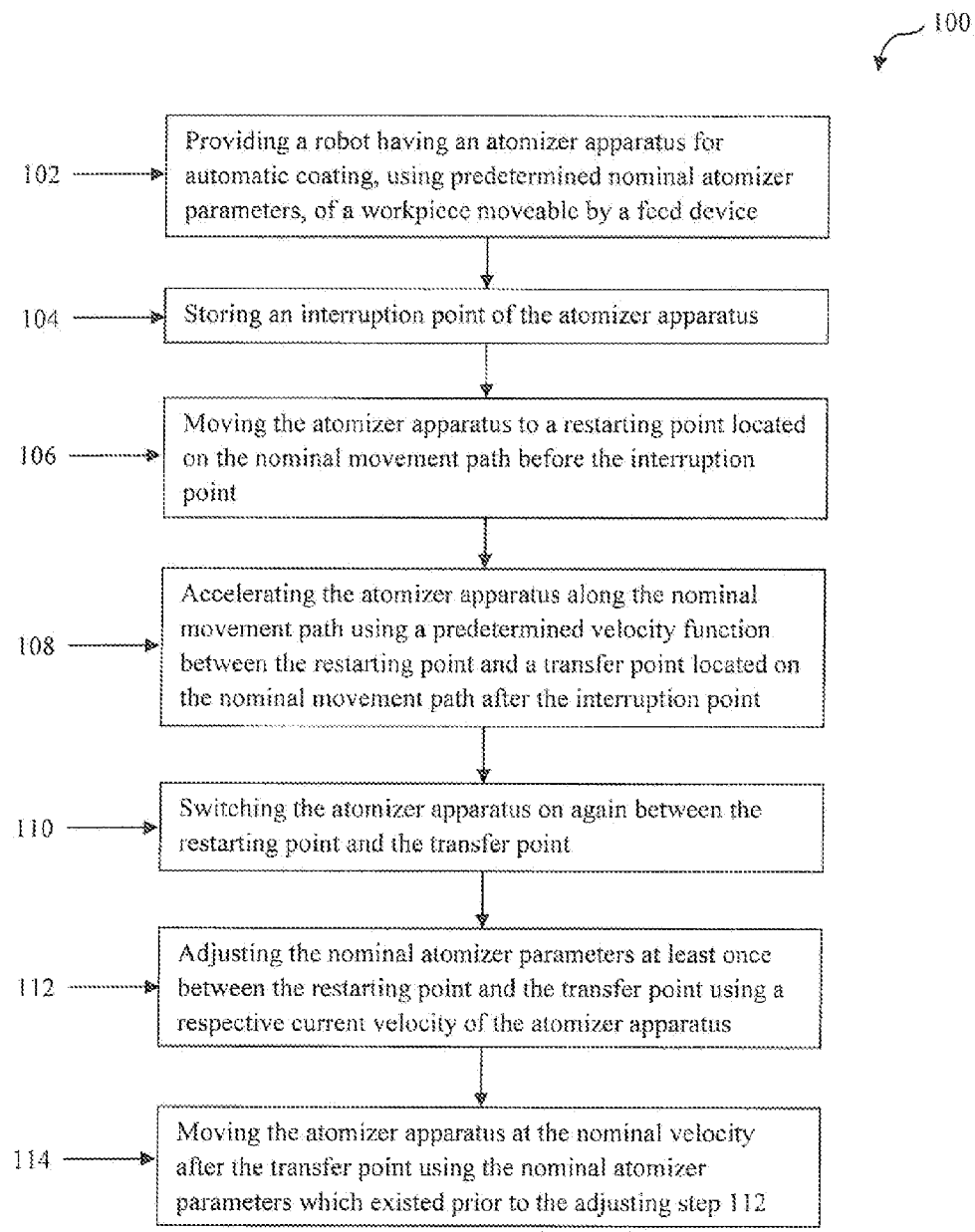
FIG. 2 shows a method for restarting a robot in accordance with an embodiment of the present invention.

Referring to FIG. 2, a method for restarting a robot after an interruption of a nominal movement of an atomizer apparatus at a nominal velocity along a nominal movement path relative to the workpiece 100 is shown. A robot having an atomiser apparatus for automatic coating, using predetermined nominal atomizer parameters, of a workpiece moveable by a feed device is provided at step 102. An interruption point of the atomizer apparatus is stored at step 104. The atomizer apparatus is moved to a restarting point located on the nominal movement path before the interruption point at step 106. The atomizer apparatus is accelerated along the nominal movement path using a predetermined velocity function between the restarting point and a transfer point located on the nominal movement path after the interruption point at step 108. The atomizer apparatus is switched on again between the restarting point and the transfer point at step 110. The nominal atomizer parameters are adjusted at least once between the restarting point and the transfer point using a respective current velocity of the atomizer apparatus at step 112, the respective current velocity being different from the nominal velocity. The atomizer apparatus is moved at the nominal velocity after the transfer point using the nominal atomizer parameters which existed prior to the adjusting step 112 at step 114.

LIST OF REFERENCE SYMBOLS

10 Procedure plan for the procedure for restarting
12 First path point
14 Termination point
15 Interruption point
16 End point
18 Restarting point
19 Range for switching on again
20 Transfer point
22 Second path point
30 Nominal movement path

What is claimed is:

1. A method for restarting a robot having an atomizer apparatus for coating, using predetermined nominal atomizer parameters, of a workpiece moveable by a feed device after an interruption of a nominal movement of the atomizer apparatus at a nominal velocity along a nominal movement path relative to the workpiece, the method comprising:
   storing an interruption point of the atomizer apparatus;
   moving the atomizer apparatus to a restarting point located on the nominal movement path before the interruption point;
   accelerating the atomizer apparatus along the nominal movement path using a predetermined velocity function between the restarting point and a transfer point located on the nominal movement path after the interruption point;
   switching the atomizer apparatus on again between the restarting point and the transfer point;
   adjusting the nominal atomizer parameters at least once between the restarting point and the transfer point using a respective current velocity of the atomizer apparatus, the respective current velocity being different from the nominal velocity; and
   moving the atomizer apparatus at the nominal velocity after the transfer point using the nominal atomizer parameters which existed prior to the adjusting step.

2. The method as recited in claim 1, wherein the atomizer apparatus is switched on in a switching-on range that includes the interruption point and a switching-off point at which the coating ended after the interruption.

3. The method as recited in claim 1, wherein the adjusting of the nominal atomizer parameters is performed so as to provide a velocity-independent layer thickness distribution of the coating corresponding approximately to a layer thickness for the nominal atomizer parameters at the nominal velocity.

4. The method as recited in claim 1, wherein the adjusting of the nominal atomizer parameters include adjusting an outlet flow rate of the coating and at least one of guidance air and horn air.

5. The method as recited in claim 1, wherein the adjusting of the nominal atomizer parameters include adjusting at least one of a rotation speed and an atomizer air.

6. The method as recited in claim 1, wherein the predetermined velocity function at the transfer point corresponds to the nominal velocity.

7. The method as recited in claim 1, wherein by the predetermined velocity function includes a position-dependent or time-dependent ramp.

8. The method as recited in claim 1, wherein the step of adjusting the atomizer parameters is performed before the step of switching the atomizer apparatus on again.

9. The method as recited in claim 1, further comprising compensating for switching delay times of the atomizer apparatus.

\* \* \* \* \*